Figure 1:
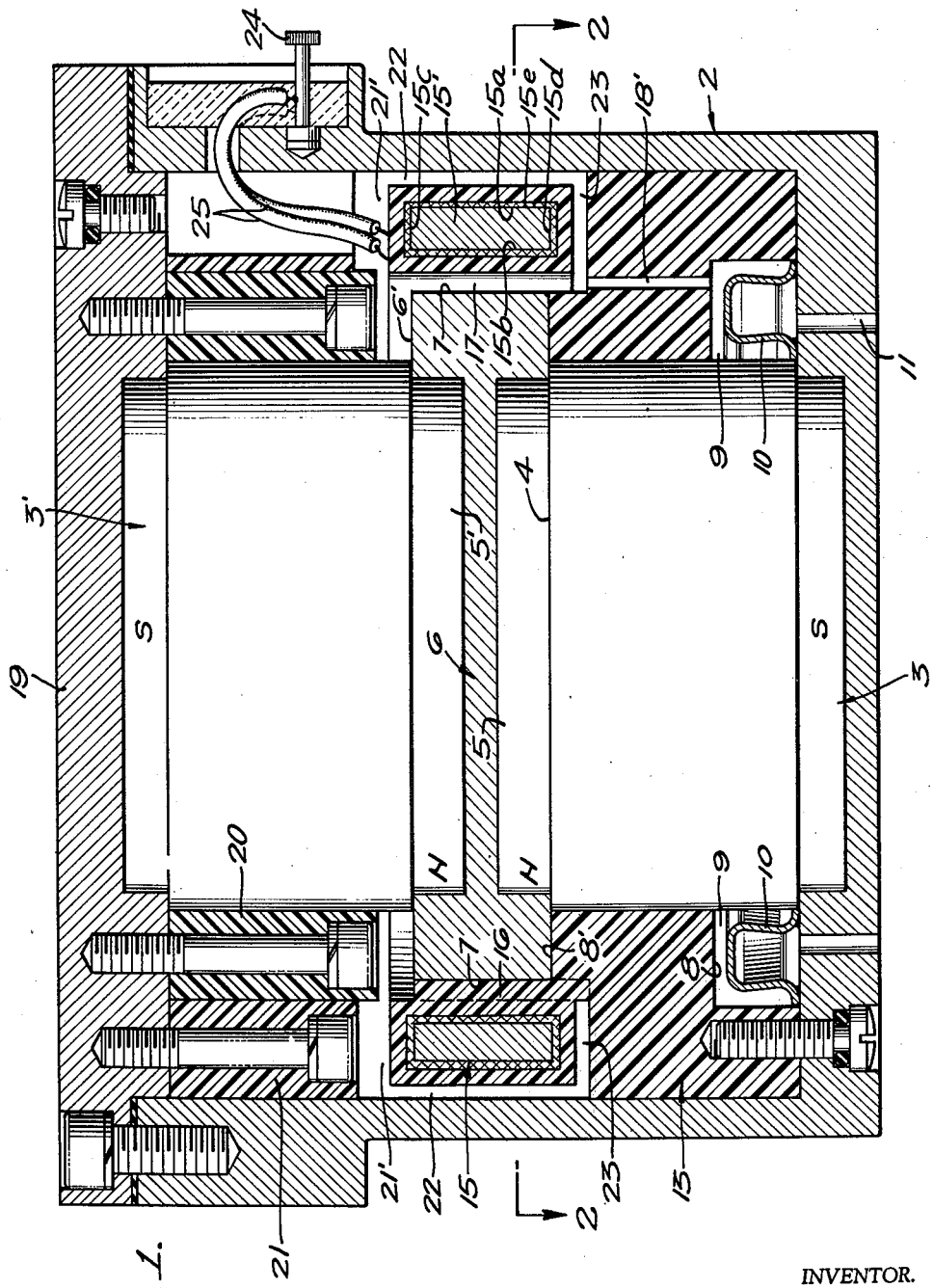

Jan. 8, 1963     C. K. STEDMAN     3,072,807
ANGULAR ACCELEROMETER

Filed Dec. 12, 1958     5 Sheets-Sheet 1

INVENTOR.
CECIL K. STEDMAN
BY Philip Lubkow
ATTORNEY

Jan. 8, 1963 C. K. STEDMAN 3,072,807
ANGULAR ACCELEROMETER
Filed Dec. 12, 1958 5 Sheets-Sheet 2

INVENTOR.
CECIL K. STEDMAN
BY
ATTORNEY

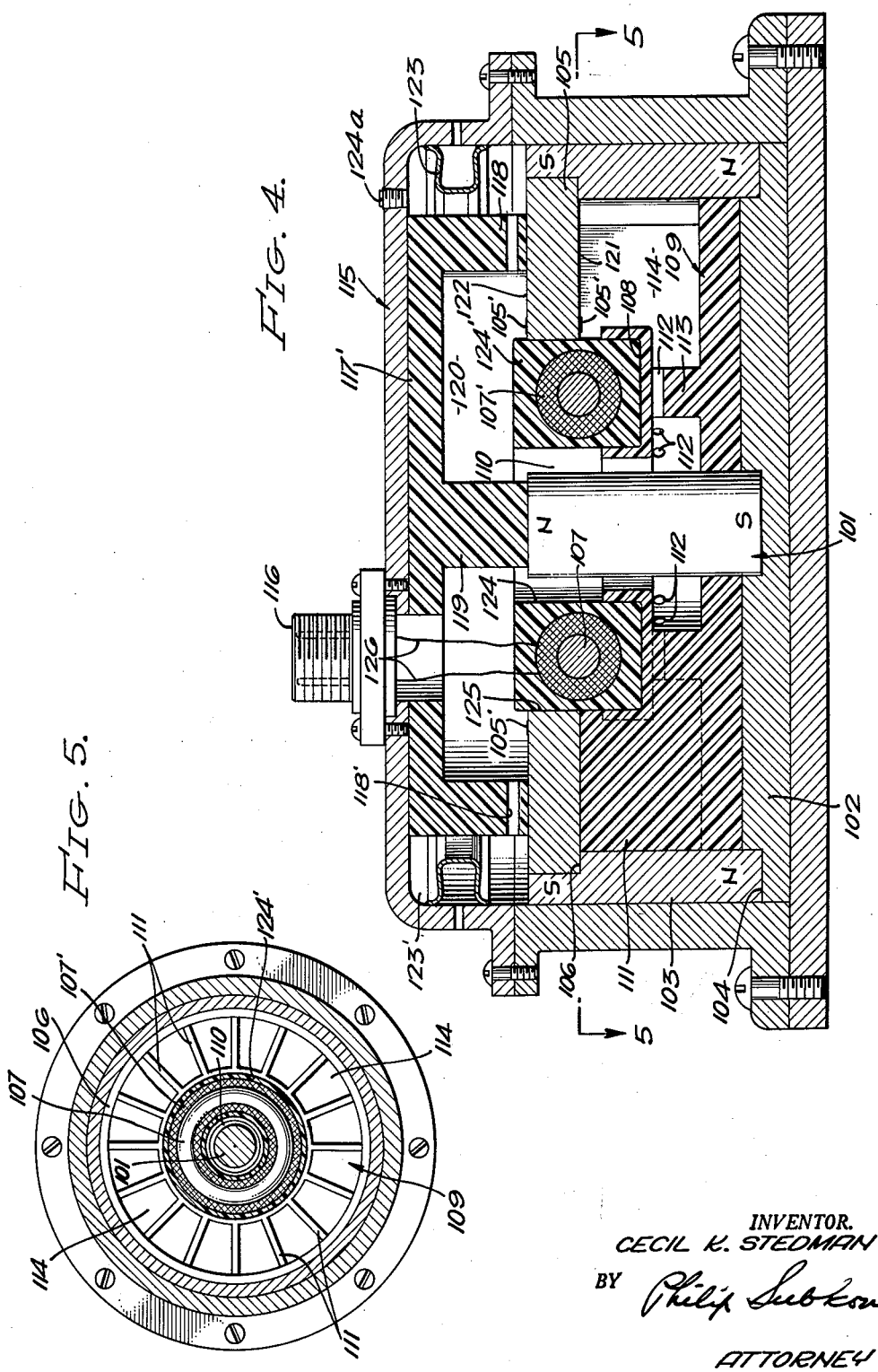

INVENTOR.
CECIL K. STEDMAN
BY
ATTORNEY

Jan. 8, 1963 C. K. STEDMAN 3,072,807
ANGULAR ACCELEROMETER
Filed Dec. 12, 1958 5 Sheets-Sheet 5

INVENTOR.
CECIL K. STEDMAN
BY
ATTORNEY

United States Patent Office 3,072,807
Patented Jan. 8, 1963

3,072,807
ANGULAR ACCELEROMETER
Cecil K. Stedman, Enumclaw, Wash., assignor to Statham Instruments, Inc., Los Angeles, Calif., a corporation of California
Filed Dec. 12, 1958, Ser. No. 780,067
12 Claims. (Cl. 310—11)

This invention relates to an angular accelerometer in which the inertial mass is a conductive fluid.

Such accelerometers have been described in the Statham et al. Patent No. 2,753,469. In such devices the conductive fluid is caused to move with respect to a magnetic field and a difference in potential is generated in the fluid. The magnitude of the potential generated is related to the magnitude of the angular acceleration of the case with respect to the fluid which produces a relative circulatory movement of the fluid mass when it is accelerated. Such relative motion will be hereinafter referred to for convenience as a circulation of the fluid with respect to the channel as a frame of reference.

In the motion sensing device of my invention, a closed current path is provided in which the liquid is included. The motion of the liquid relative to the magnetic field induces an electromotive force (E.M.F.) in the liquid in such manner that a current circulates in the liquid. This loop may be referred to as the primary loop. A secondary coil is inductively coupled with the current loop which includes the liquid. A magnetically conductive core is provided. The loop and coil both link the core. The current circulating in the loop induces a magnetic flux in the core which changes as the case is accelerated. This variation in the flux in the core induces an E.M.F. in the secondary responsive to variations in the current flow in the closed current loop. This potential will be thus responsive to the angular acceleration of the device.

The principles of my invention may be applied to various configurations, provided the precaution is taken that the potentials induced in different portions of the primary loop do not oppose each other.

In order to accomplish this result I may restrict the movement of the liquid so that the liquid moves relative to the core at one peripheral portion of the core cross section and is quiescent at an opposite peripheral section of the core cross section or moves in opposite directions at such opposite peripheral sections. In the former case a potential is induced in the liquid in one direction only and the current loop is completed by means of a conductive path. In the latter case the potentials induced in the different portions of liquid are in opposite directions and are therefore additive and not in opposition.

In one embodiment of the motion sensing device of my invention, I cause the fluid to circulate about the axis of a ring core on which a coil is toroidally wound. I provide a mounting for the coil such that the fluid circulates about either the outer or inner portion of the perimeter of the core and is prevented from circulation about the opposite perimeter of the core. A current path is provided, of which the liquid is a part, said current path linking the core of the toroidally wound coil.

In another embodiment of my invention, I provide channels for the flow of the liquid so that the relative motion of the liquid and the adjacent portion of the core is in a direction opposite to the direction of movement of the liquid with respect to an opposite portion of the core.

Figure 2:
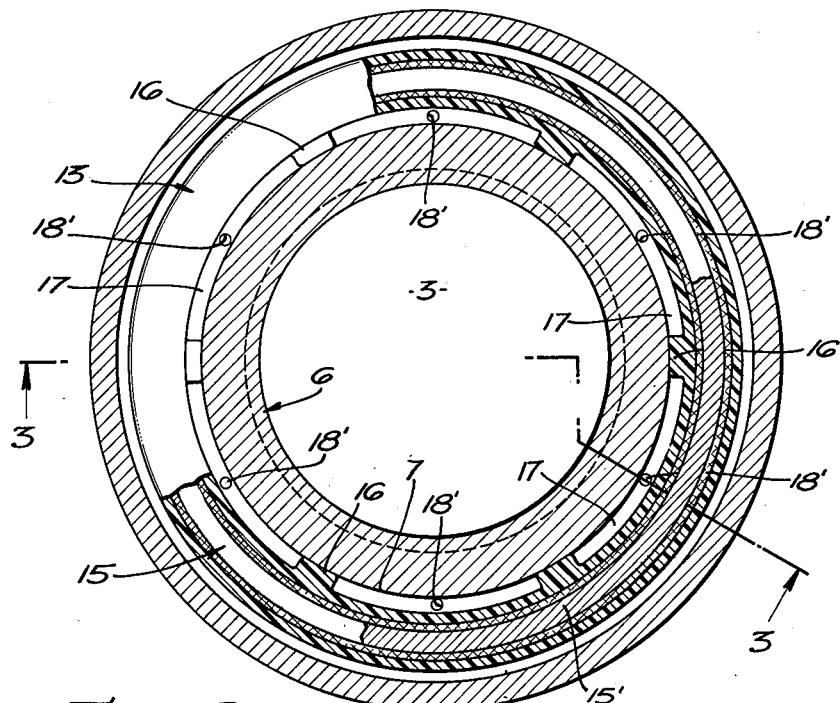
Figure 3:
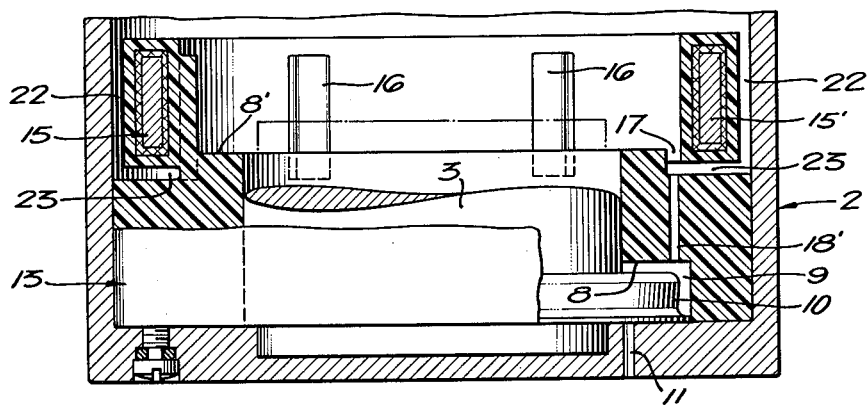
Figure 6:
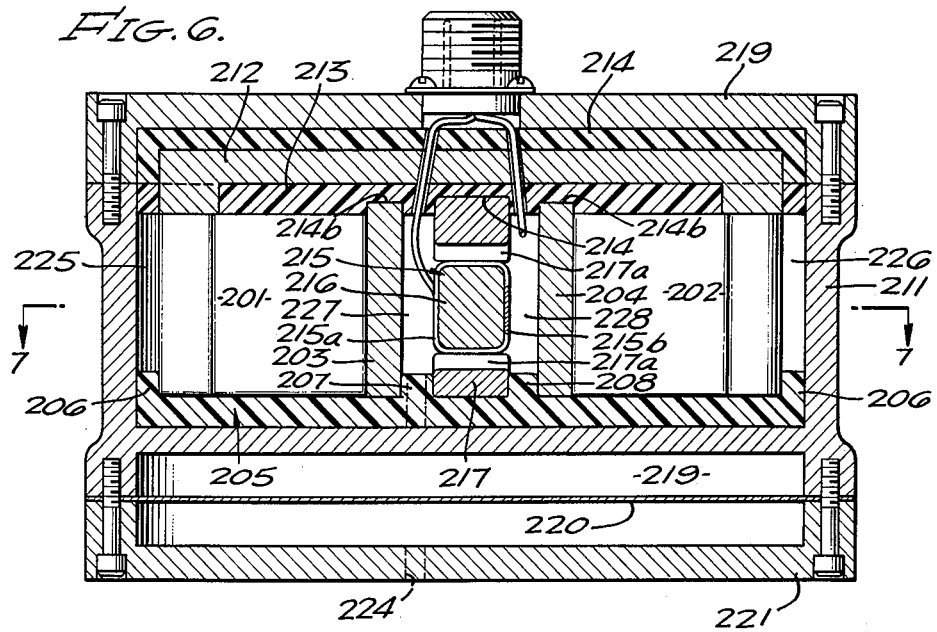
Figure 7:
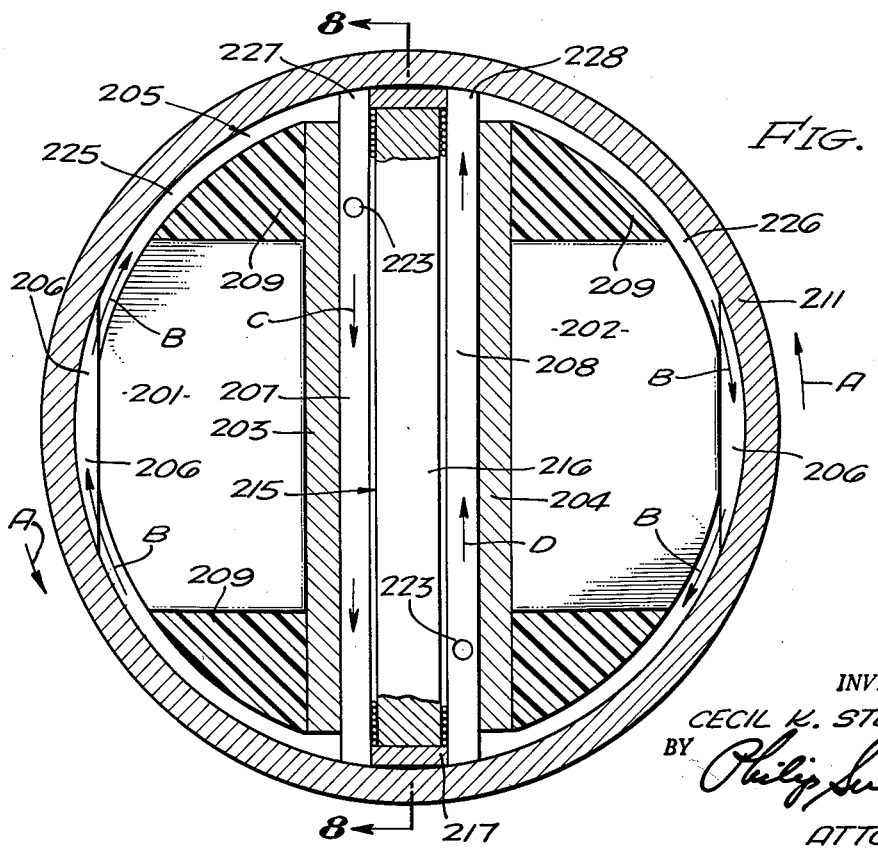
Figure 8:
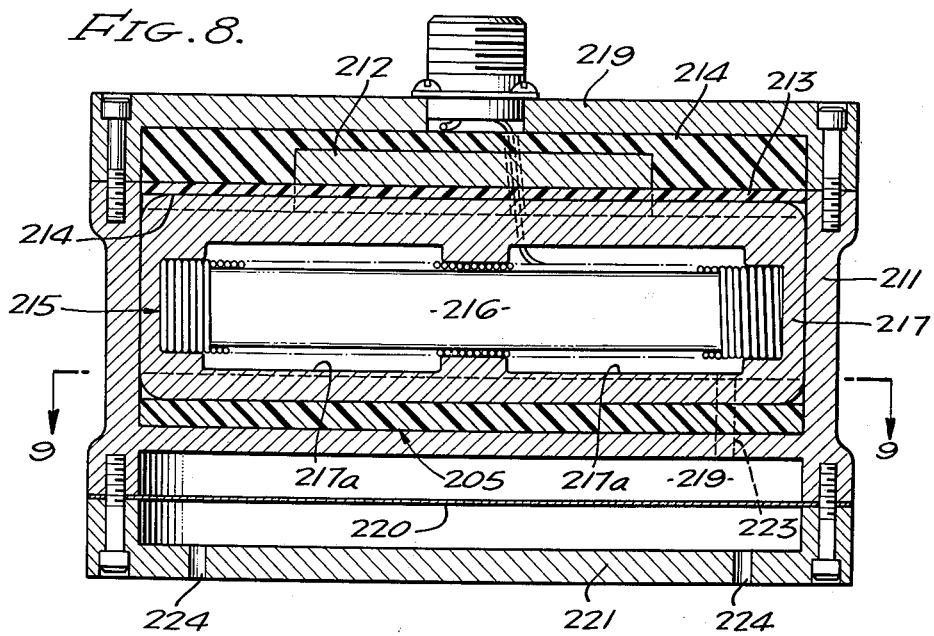
Figure 9:
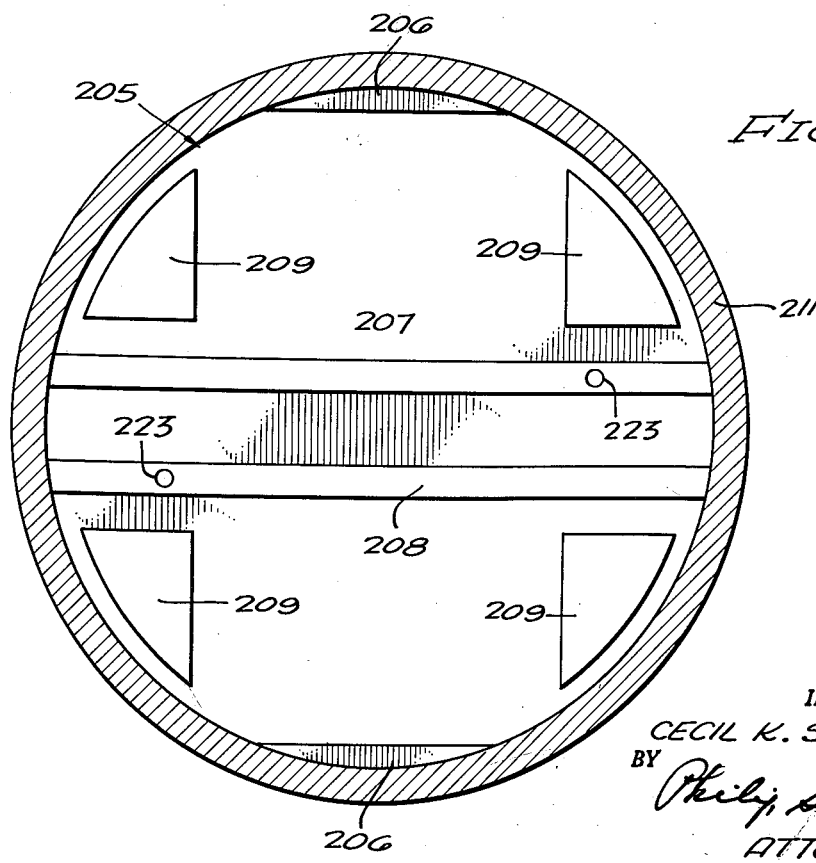

These and other objects of my invention will be further understood by reference to the following description taken together with the drawings of which:

FIG. 1 is a vertical section through one form of my invention;
FIG. 2 is a section taken on line 2—2 of FIG. 1;
FIG. 3 is a fragmentary section on line 3—3 of FIG. 2;
FIG. 4 is a vertical section taken through another form of my invention;
FIG. 5 is a section on line 5—5 of FIG. 4;
FIG. 6 is a vertical section of another form of my invention;
FIG. 7 is a section taken on line 7—7 of FIG. 6;
FIG. 8 is a section taken on line 8—8 of FIG. 7; and
FIG. 9 is a section taken on line 9—9 of FIG. 8.

In FIG. 1, the magnetically conductive cup-shaped chamber 2, made of material having a high permeability, carries a permanent magnet in the form of a cylinder 3 shouldered at 4 to give a neck 5; a like magnet 3' also having a neck 5' is also provided. The disc 6 made of material of high permeability, is formed with two recesses to receive the necks 5 and 5' respectively.

The space between the external surface 7 of the disc 6 and the internal wall of the chamber 2 is filled with a non-magnetic insulating casting 13 of a suitable synthetic resin, for example, a phenolic or other thermosetting resin or a thermoplastic potting resin. The casting is in the form of a ring which fills the space between the interior wall of the chamber 2 and the wall of the magnet cylinder 3. The interior portion of the ring is notched at 8 and 8' to provide two shoulders. The notches, together with the base of the cup 2 and the wall of the magnet 3, form an annular chamber 9. The toroidal coil 15 wound on an iron ring core 15' is cased in the casting 13 and surrounds the exterior wall 7 of the disc 6. The windings of the coil 15 extend along the peripheral sides of the core 15' at 15a, 15b, 15c and 15d, see full lines 15e. The coil 15 is spaced from the wall 7 by ridges 16 formed integrally with the casting 13 and which contact the surface 7, which act as baffles extending transversely across the channel 17. The ridges are spaced at equal distances circumferentially of the inner wall of 13 adjacent the coil 15, and thus provide vertical channels 17 between the ridge 16 and between 7 and the interior wall of the casting 13. The casting 13 is provided with bores 18', at the channels 17, which connect the channels 17 and the annular chamber 9. The casting 13 is notched by a notch 23 which intercepts the channels 17.

The circular flexible metallic diaphragm 10 having a cup-shaped cross section is brazed or welded in position in the chamber 9 and breather holes 11 are provided in the base of the container 2 to vent the interior of the circular diaphragm.

The chamber 2 is closed by a lid 19 to which are connected the ring fillers 20 and 21 of the same material as 13 to hold the cylindrical magnet in position. The leads 25 to the toroidal coil 15 are connected to suitably insulated terminal 24, one for each lead.

The spaces 21' above the coil 15, 22 exteriorly of the coil 15 and between the interior wall of 2 and the coil 15, the channel 17, the bores 18' and the chamber 9 outside of the diaphragm 10 are filled with mercury. All surfaces, which are electrically conductive and in contact with the mercury, i.e., the wall of 2 at the channel 22 and 21', magnet 3' adjacent channel 21, are coated with varnish to insulate the mercury from the conductive portion of the unit.

The magnets are positioned with like poles opposed, for example, both north poles at the plate 6. The magnetic field thus goes through 6 and through the mercury to the walls of 2 and is completed through the base of 2 and the lid 19. The channel 22 surrounds the coil 15 and the coil being concentric therewith toroidally wound thereon.

When the case 2 is given an angular acceleration, the mercury tends to remain stationary as the case is angularly accelerated, thus a relative circulation of the mercury with respect of the circular channel 22 is produced. It cannot circulate in the channels 17 due to the ridges 16. Thus a potential will be generated in the mercury in a direction parallel to the axis of the channel 22 and of the toroidal coil which is concentric therewith.

This potential will cause a current to flow through the mercury in channels 21', 22, 23 and 17. Due to this linking of the current path, with the core on angular acceleration of the case, a potential will be induced in the coil, which will appear at terminal 24, this potential being related to the angular acceleration of the case.

To provide for expansion or contraction of the mercury, I have provided the expansion chamber formed of the diaphragm 10.

In the form shown in FIG. 4, the mercury is caused to circulate relative to the interior perimeter of the core and coil instead of the exterior of the coil and core as in the form of FIG. 1. Provision is made to prevent circulation of the mercury around the opposite exterior perimeter. The structure functions in the same manner as in the form shown in FIGS. 1–3.

The permanent magnet cylindrical bar 101 is set in a base plate 102 made of material of high magnetic permeability in a recess therein provided. A permanent ring magnet 103 is set in a circular notch 104 in the base plate 102. The magnets 101 and 103 are oppositely polarized. The annular disc 105 made of material of high magnetic permeability sits in the circular notch 106 in the ring 103. A core 107 with toroidally wound coil 107' of conductive wire similar to 15 of FIG. 1 is suitably insulated in a thermosetting or thermoplastic resinous casting 124' similar to that used in the form of FIG. 1. It is positioned in an annual socket 108 in a like casting coil support 109 positioned in the plate 102 and making a snug fit with the inner surface of the ring 103. The inner peripheral surface of the annular socket 108 and of the casting 124' are spaced from the magnet 101 to form a channel 110 around the interior peripheral side of the casting 124'. The coil support 109 is formed with a plurality of baffles 111 spaced at intervals around the circumference of the coil support 109 and extend to the inner surface of the ring 103 and the underneath surface of the disc 105 and to the plate 102. A plurality of circumferentially spaced ports 112 are positioned in the flange 113 on coil support 109 forming a passageway connecting passageway 110 with the chambers 114 between the baffles 111.

The cover 115 carries a terminal connector 116 and a thermosetting or thermoplastic resinous casting 117' of smaller diameter than the case, formed with a flange 118. The casting 117' is attached to the underneath side of the cover 115 and carries a boss 119 so that when mounted, the boss clamps the magnet 101 in position and the flange 118 clamps the disc 105 and the ring 103 in position. The windings of the coil 107' extend along channel 10 and over the core 107.

All surfaces of 103 and 105 that are in contact with the mercury are varnished to make them non-conductive, except a ring portion of 105' on disc 105 positioned adjacent chambers 114 and chambers 120 underneath 117'.

The case carries a ring diaphragm 123 similar to 110 of FIG. 1 positioned in chamber 123' communicating with chamber 120 through ports 118' and a plugger fill hole 124a.

The case is filled with mercury so that chambers 114, 120, 123' and channels 110 and 112 are filled with mercury. The relationship of the windings of the toroidal coil to the circulatory path of the mercury in channel 110 is the same as described in connection with channel 22 in the form of FIG. 1 except that the mercury circulates about the inner portion instead of the outer portion of the periphery of the coil. On angular acceleration of the case, a relative motion of the mercury occurs in channel 110 along the adjacent inner peripheral surface 124 of the toroidal coil 107' and about the magnet 101. Circulation of mercury about the external surface 125 of the ring is prohibited by the baffles 111 and disc 105.

Thus a current flow occurs through a conductive path formed of the mercury in 110, 120, the unvarnished conductive surfaces 105' and the chamber 114 and the ports 112. This will induce a potential across the leads 126 of the coil 107 whose magnitude depends on the angular acceleration of the core.

In the form shown in FIG. 6, the permanent magnets 201 and 202, attached to magnet pole plates 203 and 204 of suitable magnetic permeability are positioned in the disc 205 of suitably low magnetic permeability having end flanges 206 and chordal bosses 207 and 208 and upstanding sections 209 between which the magnets and their pole pieces are positioned. The parts 205, 206, 207, 208 and 209 may be conveniently cast from one piece of plastic material and set in the case 211. The magnetic return path plate 212 is notched to receive a plate 213 of low magnetic permeability such as a plastic plate. Plate 213 carries grooves 214b to locate the pole pieces 203 and 204 and a notch to receive the end flanges of plate 212. The ends of the plate 212 are positioned adjacent the opposite poles of the magnets 201 and 202 to provide a magnetic return path. The spacer plate 214' is positioned on top of the plate 212.

The spirally wound electrically conductive insulated coil 215 is wound on an iron core 216 and positioned in the frame 217, which is positioned in the groove 214 and between the bosses 207 and 208. It is clamped between the plates 213 and 205 by means of the cover 219. The frame may be made of iron and the case may be made of non-magnetic material such as plastic or non-magnetic metal of low permeability. The frame is notched at 217a above and below the core 216 to provide apertures above and below the core 216. The expansion chamber is closed by a flexible diaphragm 220 and communicates with the case 211 through vents 223. The diaphragm is covered by a spaced cover 221 which is vented to the atmosphere through vents 224 positioned one on each side of the core at the channels 227 and 228.

The case and chamber are filled with mercury which fills the annular arcuate spaces 225 and 226 between the magnets and the case and also fills the chordal passageways 227 and 228 which are separated from each other by the core 216 and the frame 217 which form a barrier wall separating the case into two subchambers in which the magnets are positioned, and in which there is a conductive path via openings 217a at the top and bottom of the core as well as via the frame 217. The arcuate passageways 225 and 226 connect the ends of the passageways 228 and 227 respectively.

On angular acceleration of the case 211, for example, in the direction of the arrows A—A of FIG. 7, the mercury will circulate relative to the case in the directions of the arrows B—B, and in opposite directions (see arrows C—D) in the chordal passageways 227 and 228.

The direction of potentials induced in the channel 227 is opposite to that induced in the mercury in the channel 228 and the potentials are thus additive. The current path in the liquid is thus a closed path through the liquid in the passageways 227 and 228 and passageways 217a. The primary current loop links the coil 215 and the core 216 on which the secondary in wound. The potential thus induced in the coil 215 appears at the terminals of the coil 215 and will be responsive to the angular acceleration and a measure thereof.

While I have described a particular embodiment of my invention for the purpose of illustration, it should be understood that various modifications and adaptations thereof may be made within the spirit of the invention as set forth in the appended claims.

I claim:

1. A motion sensing device comprising a chamber, a passageway in said chamber, an electrically conductive liquid in said passageway, an electrically conductive primary loop in said chamber, said loop including said liquid and positioned transversely to said passageway, a magnet in said chamber, the poles of said magnet being spaced apart transversely of said passageway, said passageway being positioned between said poles, a secondary conductive loop, a magnetically conductive core, said secondary conductive loop and said primary conductive loop linking said core, terminals for said secondary loop whereby on acceleration of said chamber said liquid moves in said passageway relative to said magnetic field and said secondary loop and a potential is induced at the terminals of said loop.

2. In the device of claim 1, in which said core is a ring core having an interior and an exterior perimeter, one of said perimeters being positioned adjacent said passageway whereby said liquid moves adjacent said perimeter and means in said chamber to prevent the circulation of said liquid adjacent the other of said perimeters.

3. In the device of claim 1, in which said secondary loop is composed of a plurality of turns of electrically conductive wire, said passageway including separate return passageways, one adjacent one portion of the surface of said core and another passageway adjacent an opposite portion of the surface of said core, whereby on angular acceleration of said case said liquid circulates in opposite directions in said return passageways.

4. A motion responsive device comprising a chamber, a closed continuous liquid passageway in said chamber, a magnet in said chamber, the opposite poles of said magnet being spaced apart transversely of said passageway, said passageway being positioned between said poles, an electrically conductive liquid in said channel, a magnetically conductive ring core, a coil toroidally wound on said ring core and positioned in said chamber, a peripheral side of said coil and core positioned in said chamber, said channel extending around the said peripheral side of said coil and core, means to prevent the circulation of said liquid about the side of said toroidal coil and core opposite said first mentioned peripheral side, an electrically conductive path about and linking said ring core, said path extending over said peripheral sides and through said channel, terminals connected to said coils whereby on angular acceleration of said chamber said channel and said liquid move in relative circulatory motion of said liquid around said channel and around said first mentioned peripheral side, and a potential difference is established at said terminals.

5. In the motion responsive device of claim 4, said opposite peripheral side positioned in said channel, said means to prevent said circulation about opposite peripheral side, including baffles extending across said channel adjacent said opposite side.

6. A motion responsive device comprising a chamber, a closed continuous liquid passageway in said chamber, a magnet in said chamber, the opposite poles of said magnet being spaced apart transversely of said passageway, said passageway being positioned between said poles, an electrically conductive liquid in said channel, a magnetically conductive ring core, a coil toroidally wound on said core and positioned in said chamber, an exterior peripheral side of said core and coil positioned in said chamber, said channel extending around the said peripheral side of said core and coil and concentric therewith, means to prevent the circulation of said liquid in said channel about a peripheral side of said core and coil opposite said first mentioned peripheral side, an electrically conductive path about said core and toroidal coil including said liquid and linking said ring core, said path extending over said peripheral sides and through said channel, terminals connected to said coil whereby on angular acceleration of said chamber a relative circulatory motion of said liquid extends around said channel and around said first mentioned peripheral side, and a potential difference is established at said terminals.

7. In the motion responsive device of claim 6, said means to prevent circulation of said liquid about said opposite side including baffles positioned transversely of said channel.

8. A motion responsive device comprising a chamber, a closed continuous liquid passageway in said chamber, a magnet in said chamber, the opposite poles of said magnet being spaced apart transversely of said passageway, said passageway being positioned between said poles, an electrically conductive liquid in said channel, a magnetically conductive ring core, a coil toroidally wound on said core and positioned in said chamber, an interior peripheral side of said core and coil positioned in said chamber, said channel extending around the said peripheral side of said core and coil and concentric with said core and coil, means to prevent the circulation of said liquid in said channel about a peripheral side of said core and coil opposite said first mentioned peripheral side, an electrically conductive path about said toroidal coil including said liquid and linking said ring core, said path extending over said peripheral sides and through said channel, terminals connected to said coil whereby on angular acceleration of said chamber a relative circulatory motion of said liquid extends around said channel and around said first mentioned peripheral side, and a potential difference is established at said terminals.

9. In the motion responsive device of claim 8, said means to prevent said circulation about said opposite side including baffles extending transversely across said channel.

10. A motion responsive device comprising a chamber, an elongated coil in said chamber, said coil comprising a plurality of turns of conductive wire and terminals therefor, a magnetically conductive core for said coil, said core and coil separating said chamber into a pair of subchambers, a pair of magnets positioned in said chamber and spaced from said coil, said spacing providing an elongated liquid passageway on each side of said core and coil, a pair of oppositely polarized magnets in said chamber spaced apart, said core, coil and said passageway positioned between the poles of said magnets, a conductive liquid in said passageways, an electrically conductive path between the liquid in said passageways forming a primary conductive loop linking said core whereby on acceleration of said coil liquid moves in said passageways in opposite directions on both sides of said coil and a potential is induced at the terminals of said coil.

11. In the device of claim 10, in which each of said subchambers have arcuate channels, the channel in one subchamber connecting the ends of one of said passageways and the channel in the other subchamber connecting the ends of the other of said passageways, whereby on angular acceleration of said chamber said liquid circulates in one direction in one of said passageways and in the opposite direction in the other passageway and connecting channel.

12. A motion responsive device which comprises a chamber, a closed continuous liquid channel in said chamber, a conductive liquid in said channel, said liquid flowing with respect to said channel on angular acceleration of said chamber, a closed electrical conductive primary loop in said chamber including said liquid, spaced magnet poles in said channel cooperating with said liquid to cause an electrical current to flow in said closed primary loop on movement of said liquid relative to said channel, a secondary coil inductively coupled with said primary loop whereby a potential is induced in said secondary on angular acceleration of said channel.

References Cited in the file of this patent
UNITED STATES PATENTS
2,753,469    Statham et al. _____ July 3, 1956